Figure 4:
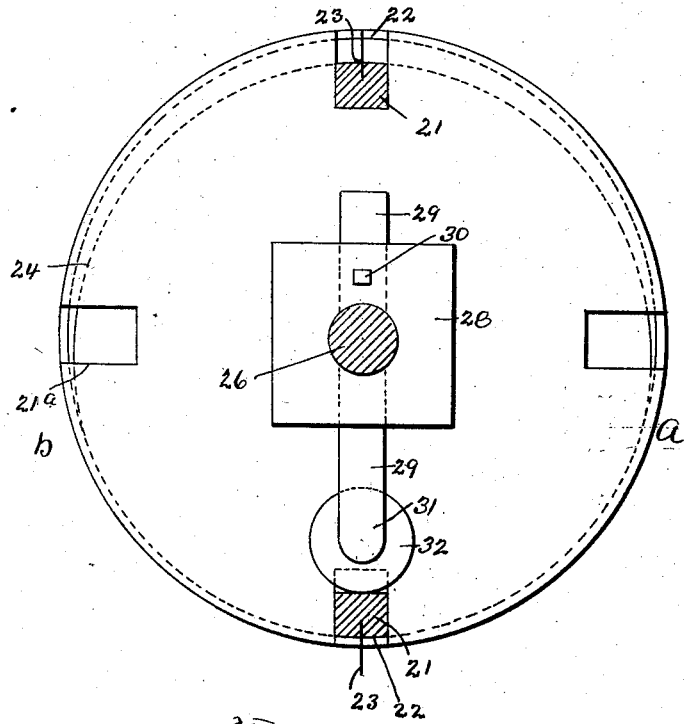

W. F. HUTCHINSON.
SPLINT CUTTING MACHINE.
APPLICATION FILED JUNE 14, 1911.
1,011,435.
Patented Dec. 12, 1911.
2 SHEETS—SHEET 1.
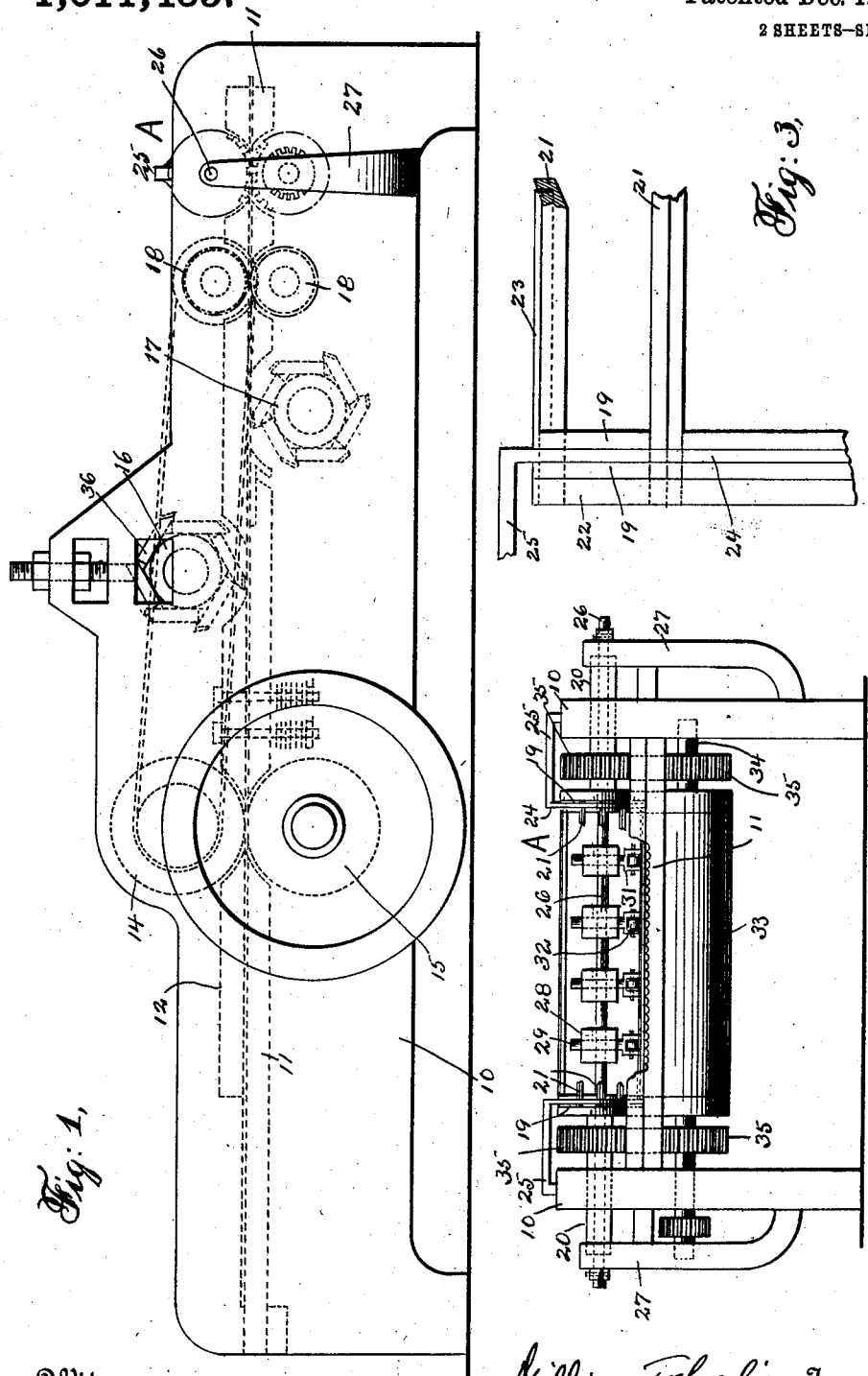

W. F. HUTCHINSON.
SPLINT CUTTING MACHINE.
APPLICATION FILED JUNE 14, 1911.

1,011,435.

Patented Dec. 12, 1911.
2 SHEETS—SHEET 2.

Witnesses:
Arthur J. Damrell,
Thomas T. Seelye.

William F. Hutchinson, Inventor,
By his Attorney
W. B. Hutchinson.

COLUMBIA PLANOGRAPH CO., WASHINGTON, D. C.

UNITED STATES PATENT OFFICE.

WILLIAM F. HUTCHINSON, OF VALATIE, NEW YORK, ASSIGNOR TO MATCH SUPPLY COMPANY, OF WATERVLIET, NEW YORK, A CORPORATION OF NEW YORK.

SPLINT-CUTTING MACHINE.

1,011,435.  Specification of Letters Patent.  Patented Dec. 12, 1911.

Application filed June 14, 1911. Serial No. 633,116.

*To all whom it may concern:*

Be it known that I, WILLIAM F. HUTCHINSON, of Valatie, Columbia county, New York, have invented a new and useful Improvement in Splint-Cutting Machines, of which the following is a full, clear, and exact description.

My invention relates to improvements in machines for cutting splints from long strips of stock or veneer, although the machine can be used equally well for forming other cylindrical articles or articles which are of other shape but are made in long lengths and in multiple.

The machine as illustrated is specially designed for cutting cylindrical objects, but as will be hereinafter seen, the cross sectional shape of the article cut by the machine depends on the shape of the cutters.

The principal object of this invention is to provide means for rapidly severing the long lengths of formed stock into shorter predetermined lengths. In the formation of match splints for instance, the stock is fed through the machine in long lengths, and the cutters rapidly divide the stock into long sticks which lie side by side and go through the machine with great rapidity. These are cut transversely to the desired length. This machine is intended to provide a very positive and rapidly acting cut-off which will cut the long lengths of stock squarely, and in which the severing knives will travel at the same rate of speed as the stock so that the feeding of the machine will not be interfered with, and perfect ends formed on the severed splints.

This invention also provides for an improved form of cutter which operates nicely on the stock, and which can be easily kept in shape.

Reference is to be had to the accompanying drawings forming a part of this specification, in which similar reference characters indicate corresponding parts in all the views.

Figure 5:
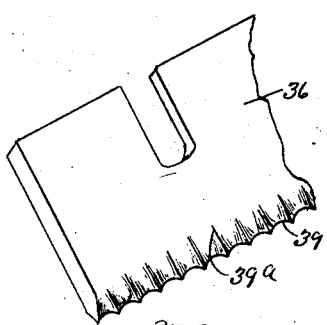
Figure 6:
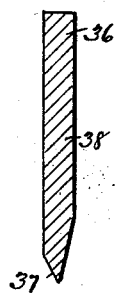

Figure 1 is a side elevation of the machine embodying my invention. Fig. 2 is a broken rear end view of the same. Fig. 3 is a broken detail of a part of the cut-off device. Fig. 4 is a cross section of the cut-off device, and Figs. 5 and 6 are details of one of the cutters of the cutter heads.

The machine is provided with a suitable frame 10 having a bed 11 extending through it and forming a chute between itself and the plate 12, while feed rollers 14 and 15 impinge on the stock which is in the chute and force it along to the rotary cutter heads 16 and 17 which operate like buzz planers on opposite sides of the stock and form a series of semi-cylindrical cuts, thus severing the stock into long sticks or splints. The stock is further fed forward by the feed rollers 18 which impinge on the formed long sticks. This part of the machine is only shown in a general way, because it is not here claimed except as to the particular formation of the knives of the cutter heads which will be hereinafter referred to. After the stock leaves the feed rollers 18 it is cut off into desired lengths by the cut-off device shown at A. This device comprises in part opposite cylindrical head portions or ends 19 which are carried by rotary sleeves 20, these being journaled in the frame 10. At various points around the drum formed by the heads or ends 19 and the connecting parts, are radially movable knife bars 21 which have a limited movement in slots $21^a$ in the ends or heads 19 (see Fig. 4) and the cutter bars are retained in the slots by bands 22 on the peripheral end portions of the heads 19, which bands lie flush with the surface of the drum ends as shown in Fig. 4. The knife bars 21 carry thin projecting knives 23 which are adapted to severally engage the stock passing beneath the cut-off drum and sever it transversely. These knives 23 are adapted to severally pass opposite a bearing roller 33 of rawhide or other material which serves as a support for the stock while being severed and which will be hereinafter referrred to. The knife bars 21 are normally drawn inward so that the knives 23 will not project beyond the periphery of the cut-off drum, by a crescent shaped cam 24 or equivalent device, and this cam as shown is let into the drum ends 19 so that its outer or back portion will lie about flush with the surface of the said ends, while its points taper so as to coincide with the outer periphery of the drum ends as shown at $a$ and $b$ in Fig. 4. It will be seen therefore that when the knife bars 21 are in their lower position as shown at the bottom of Fig. 4, they can be forced downward to the outer limits of the slots $21^a$, but as the cut-off drum revolves, the knife bars will be engaged by the cam 24 and withdrawn as shown at the top of Fig. 4.

The cams 24 can be supported in any convenient way, and I have shown each cam secured to an arm 25 which extends upward and outward and is attached to the frame 10.

Extending longitudinally through the cut-off drum is a stationary shaft 26 which projects through the sleeves 20 and has its ends secured in the brackets 27 or equivalent supports on the sides of the frame 10. The shaft 26 is provided with several enlargements 28, though obviously the shaft can be of one size throughout its length if preferred, and extending vertically through the shaft, or to be more exact, through the enlarged parts 28 are studs 29 which are bifurcated at their lower ends as shown at 31 and carry rollers 32 which engage the several knife bars 21 as the cut-off drum revolves, and force the knife bars outward and downward so that the stock which is immediately beneath a particular knife 23 will be quickly and squarely severed. The studs 29 are adjustable and are secured by set screws 30. In this connection it will be noticed that the peripheral speed of the cut-off drum and of the knives 23 should correspond with the movement of the stock through the machine so that a square cut will be made across the stock. It will be noticed that the bearing roller 33 will hold the stock firmly up against the action of the knives 23. The bearing roller 33 is carried by a shaft 34 which is hung in suitable bearings, and the shaft 34 and the sleeves 20 are connected by gears 35 so that the cut-off drum and the bearing roller will turn at equal speeds.

It will be seen that the arrangement just described makes a very positive means of cutting off the stock the desired lengths, and it will be understood that there can be as many of the knife bars 21 and knives 23 as may be desired, without affecting the principle of the invention, and that the particular means of forcing the knives outward and inward can also be departed from without affecting the principle of the invention.

The cutter heads 17 have detachable knives 36 and the cutter heads operate like ordinary buzz-planer cutter heads, and are not referred to in detail except as to the several knives 36 which are detachable as usual in knives of this class, and the novel feature lies in the formation of their cutting portions. Each knife 36 is provided with a short bevel 37 on the inner side and with a much longer bevel 38 on the outer side. The edge is scalloped or corrugated as shown at 39, and the knife is formed with channels 39ª extending back from the edge 39 so that the knives will make semi-cylindrical cuts, but of course the formation of the edge can be changed if desired. The important thing is the arrangement of the two bevels 37 and 38, as by this construction a knife can be easily sharpened by simply grinding off the bevel 37 by holding this part against a flat stone or grinder.

I wish to call attention to the fact that the rollers 32 serve as abutments to back up the knives 23 and the knife bars 21 while the knives are in engagement with the stock, and it will be seen that it is not necessary to limit the invention to this precise form of abutment, and I wish also to call attention to the fact that the rotary cut-off drum with its knives 23 would serve in itself in connection with the roller 33, to feed the formed stock through the machine, even though the rollers 18 were not used, but I prefer to use these rollers to take the feeding strain off the cut-off knives.

I claim:—

1. In a machine of the kind described, a cut-off device comprising a stock support, a rotary drum opposite the support, knife bars movable radially in the drum, a stationary shaft extending through the drum, hangers supported on the shaft, rotatable means carried by the hangers to engage the knife bars at one point in the rotation of the bars, and means for retracting the bars.

2. In a machine of the kind described, a cut-off device comprising a stock support, a rotary drum opposite the support, knife bars movable radially in the drum, a stationary shaft extending through the drum, and rollers adjustably supported on the shaft to engage each knife bar in turn while it is in engagement with the stock.

3. In a machine of the kind described, a cut-off device comprising a stock support, a rotary drum opposite the support, radially movable knives carried by the drum and arranged to engage the stock passing between the drum and the support, a series of rollers adjustably supported within the drum to engage each knife in turn while it is in engagement with the stock, and means for retracting the knives after they have passed the rollers.

4. In a machine of the kind described, a cut-off device comprising a stock support, a drum rotating opposite the support, radially moving knives carried by the drum, a stationary shaft extending through the drum, means carried by the shaft for forcing the knives outward at one point in their rotation, and means for retracting the knives.

WILLIAM F. HUTCHINSON.

Witnesses:
  MARIE S. HUTCHINSON,
  EDWIN W. HUTCHINSON.

---

Copies of this patent may be obtained for five cents each, by addressing the "Commissioner of Patents, Washington, D. C."